May 7, 1929. H. C. GIBSON ET AL 1,711,781
ROTARY VALVE MECHANISM FOR INTERNAL COMBUSTION ENGINES
Filed March 30, 1926 8 Sheets-Sheet 2
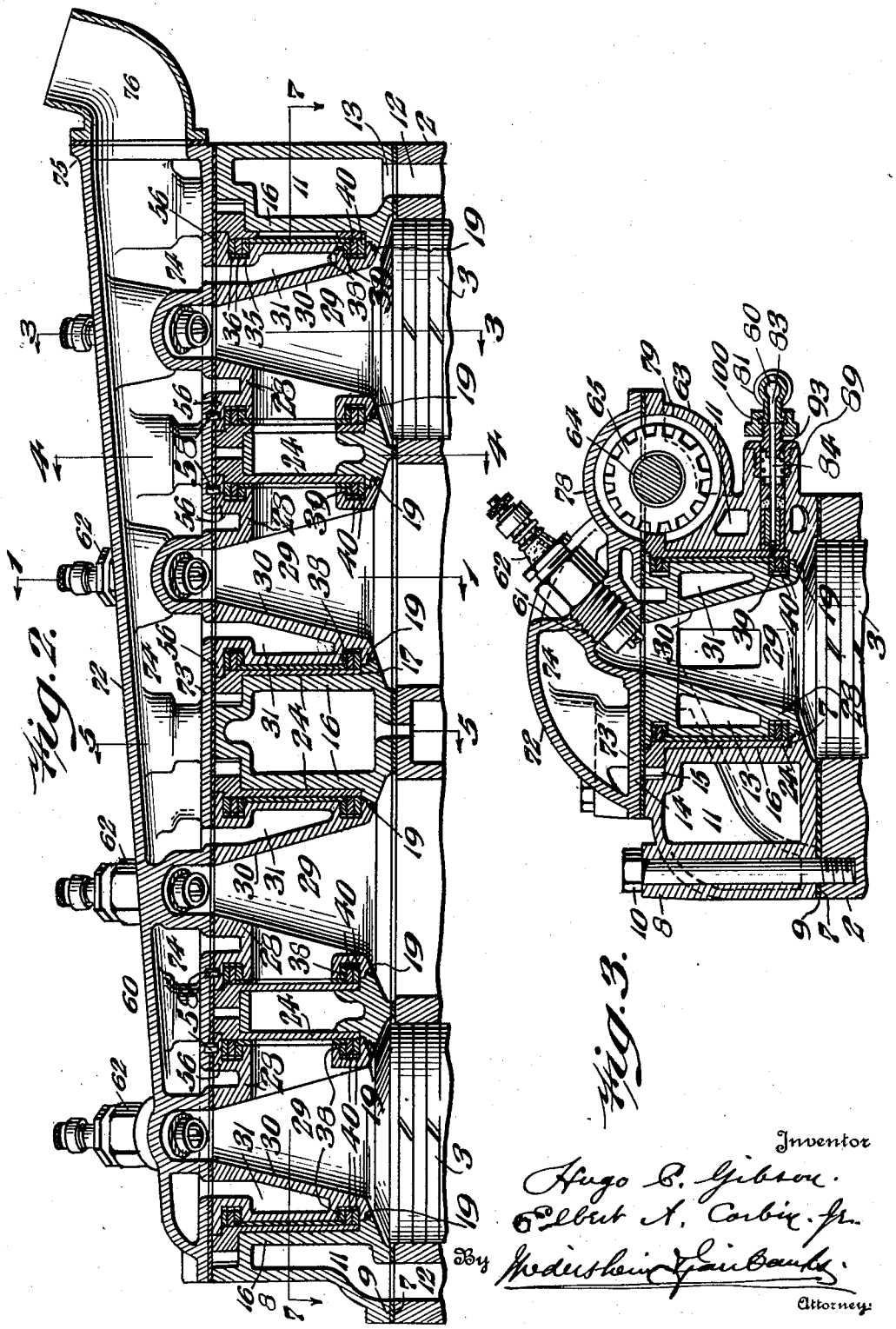
Inventor
Hugo C. Gibson
Elbert A. Corbin, Jr.
By Wedersheim Fairbanks
Attorneys May 7, 1929.  H. C. GIBSON ET AL  1,711,781
ROTARY VALVE MECHANISM FOR INTERNAL COMBUSTION ENGINES
Filed March 30, 1926  8 Sheets-Sheet 3
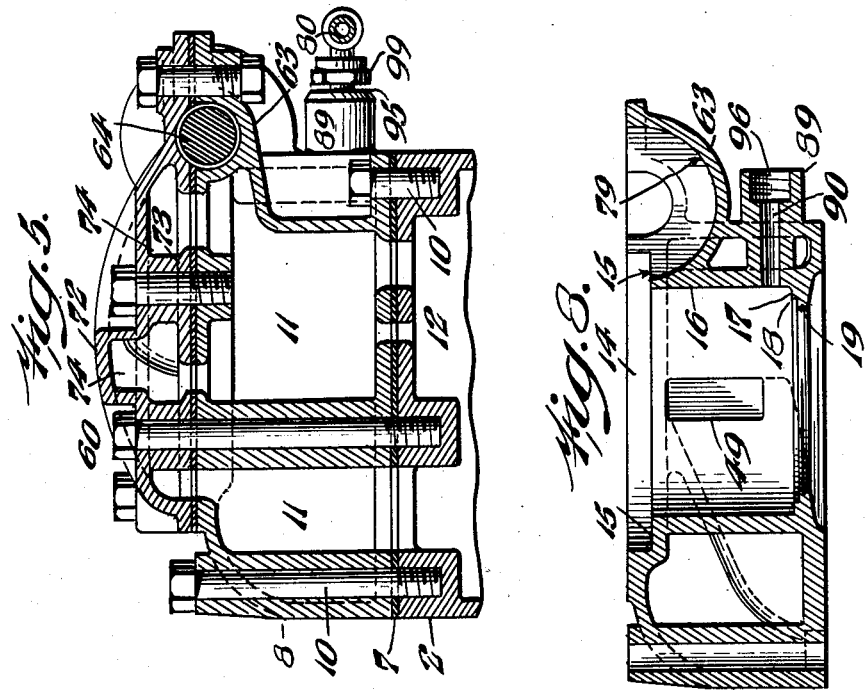
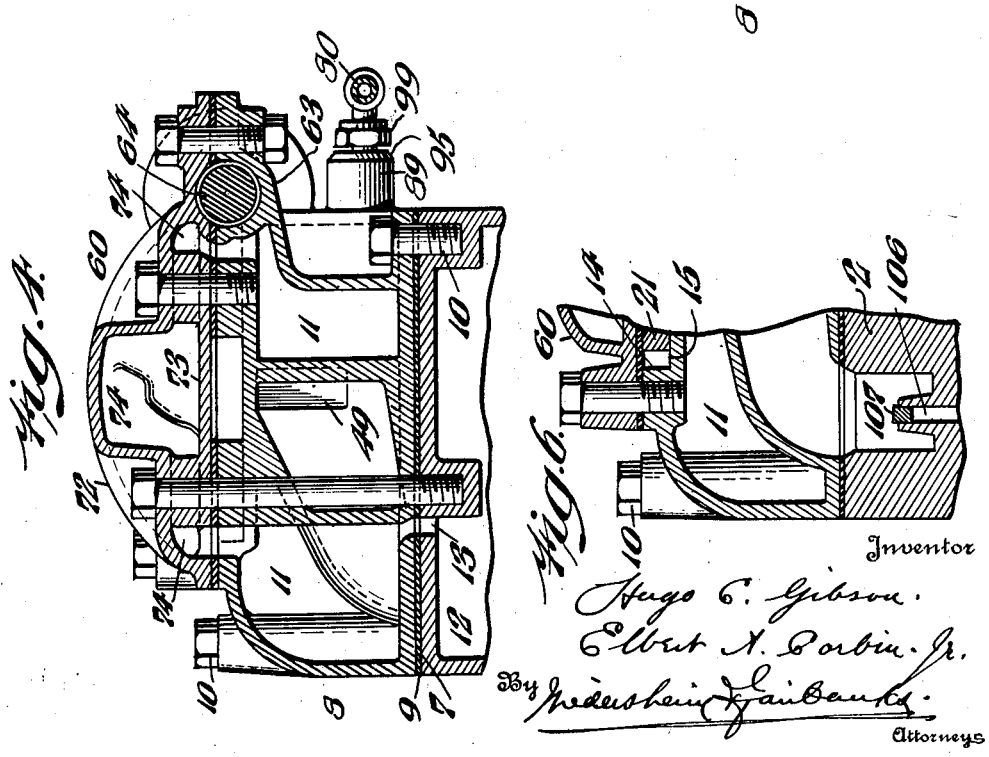

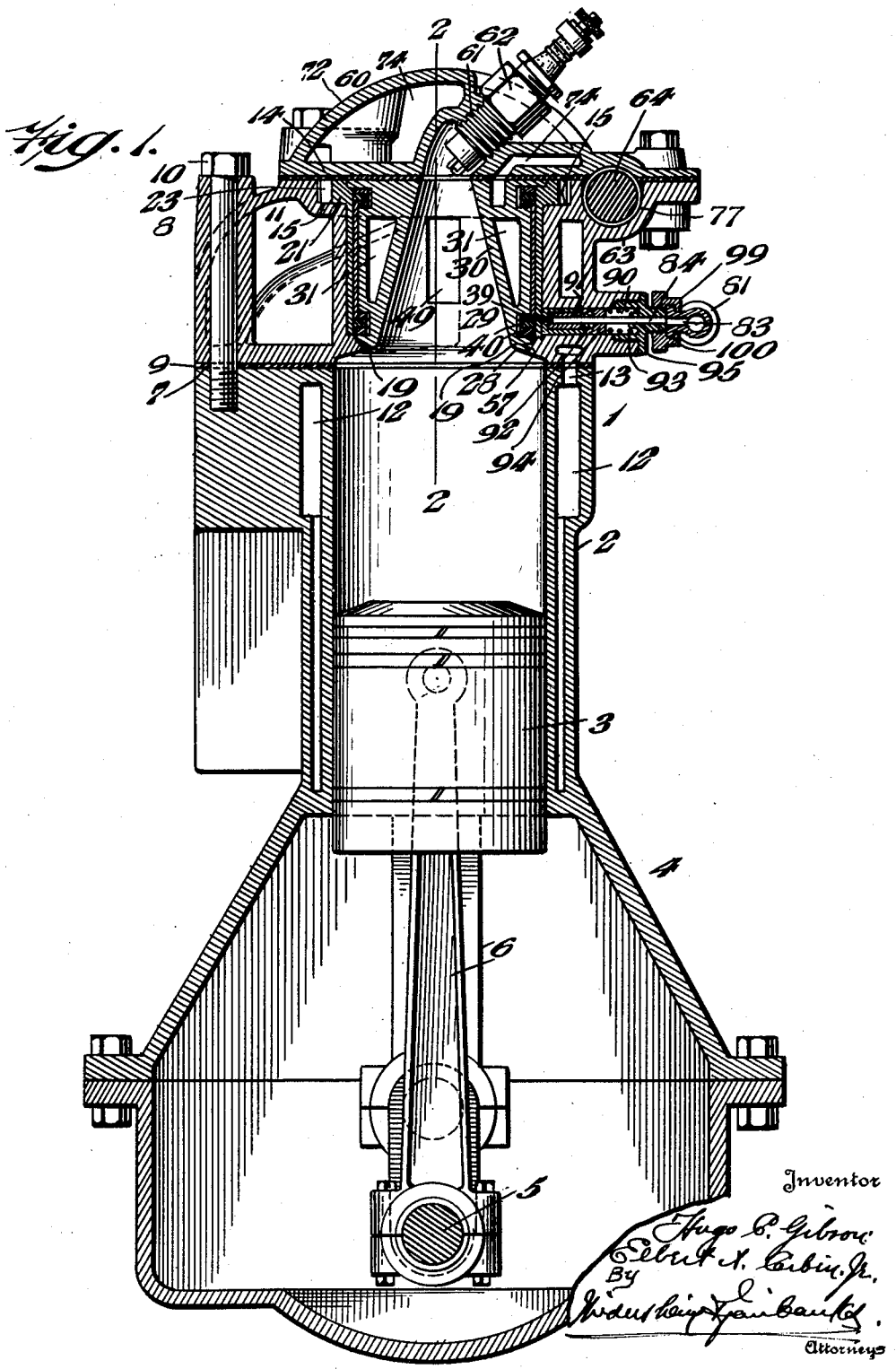

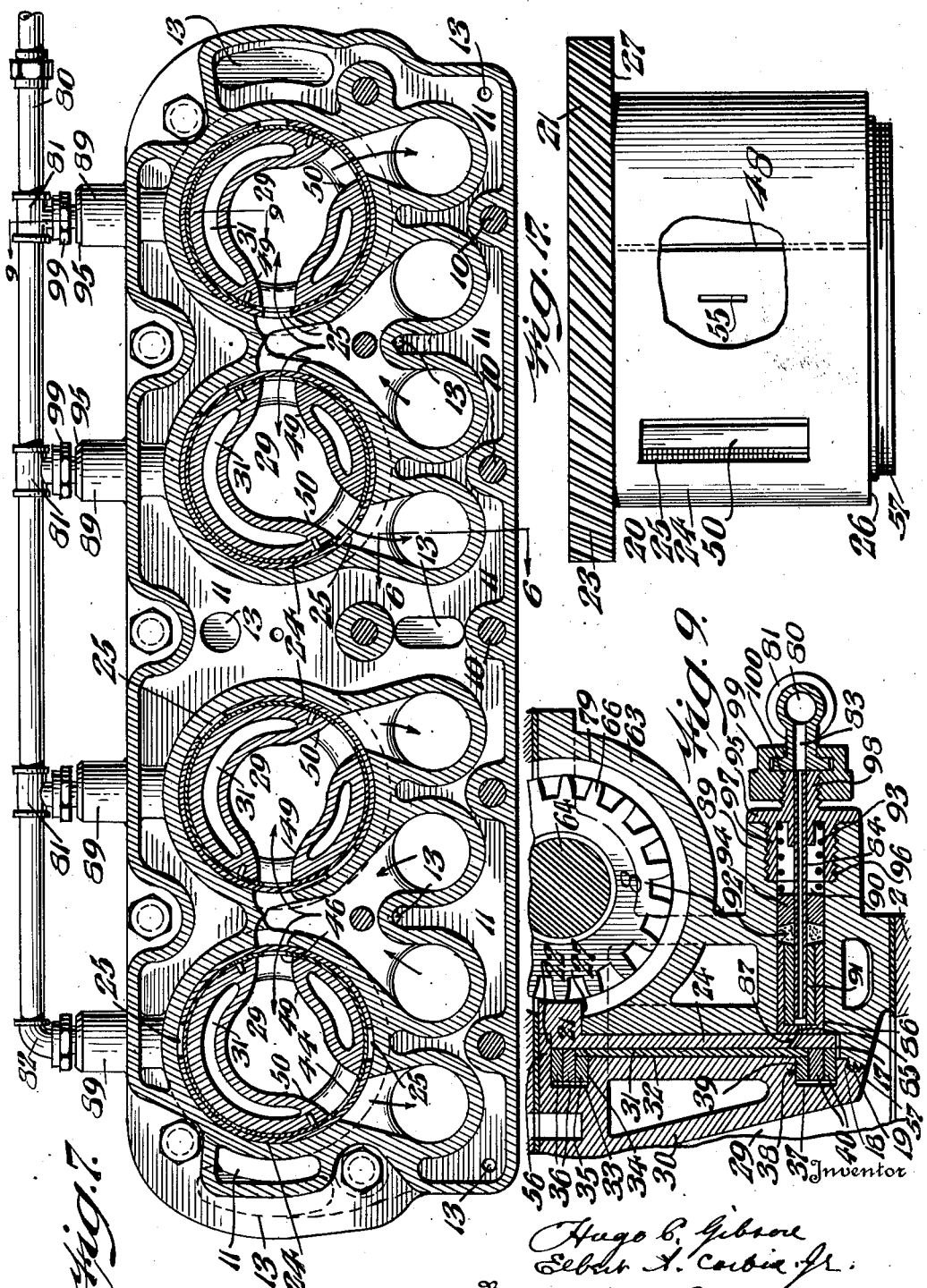

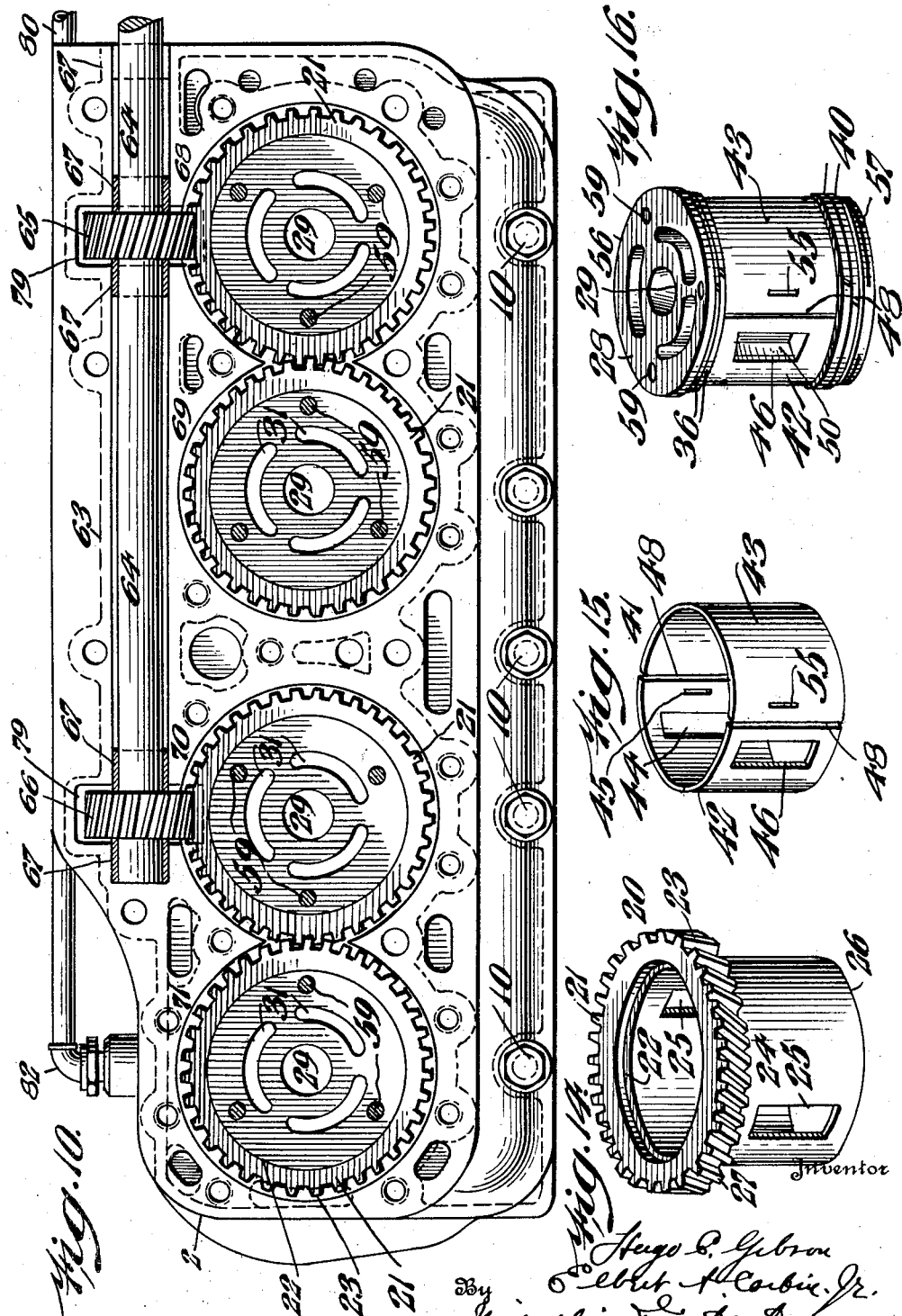

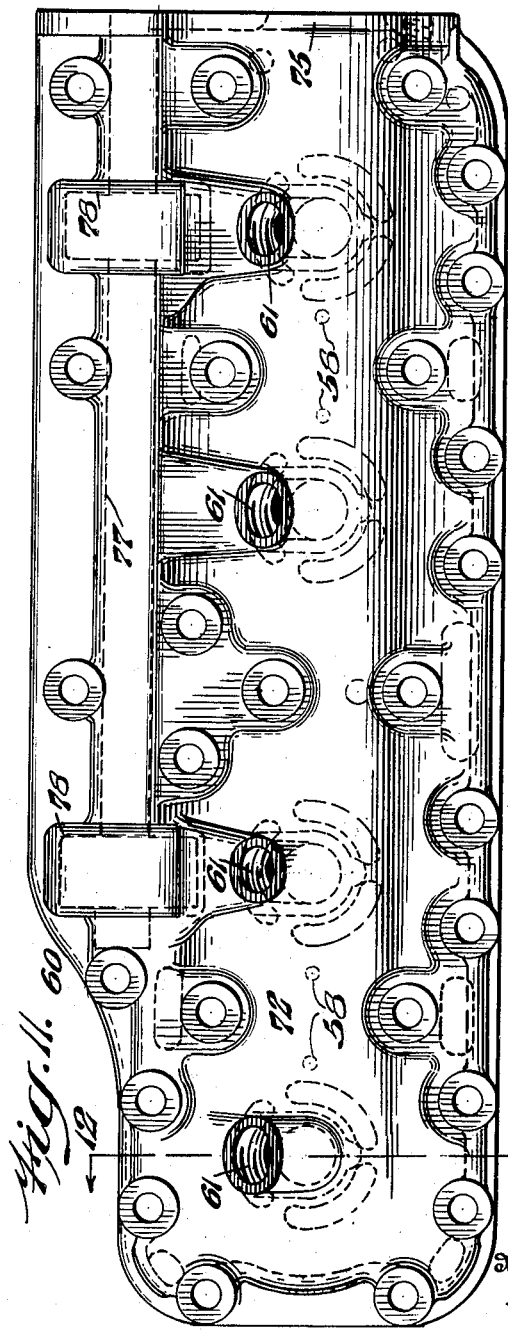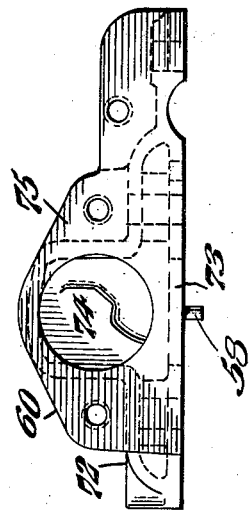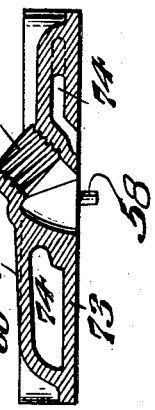

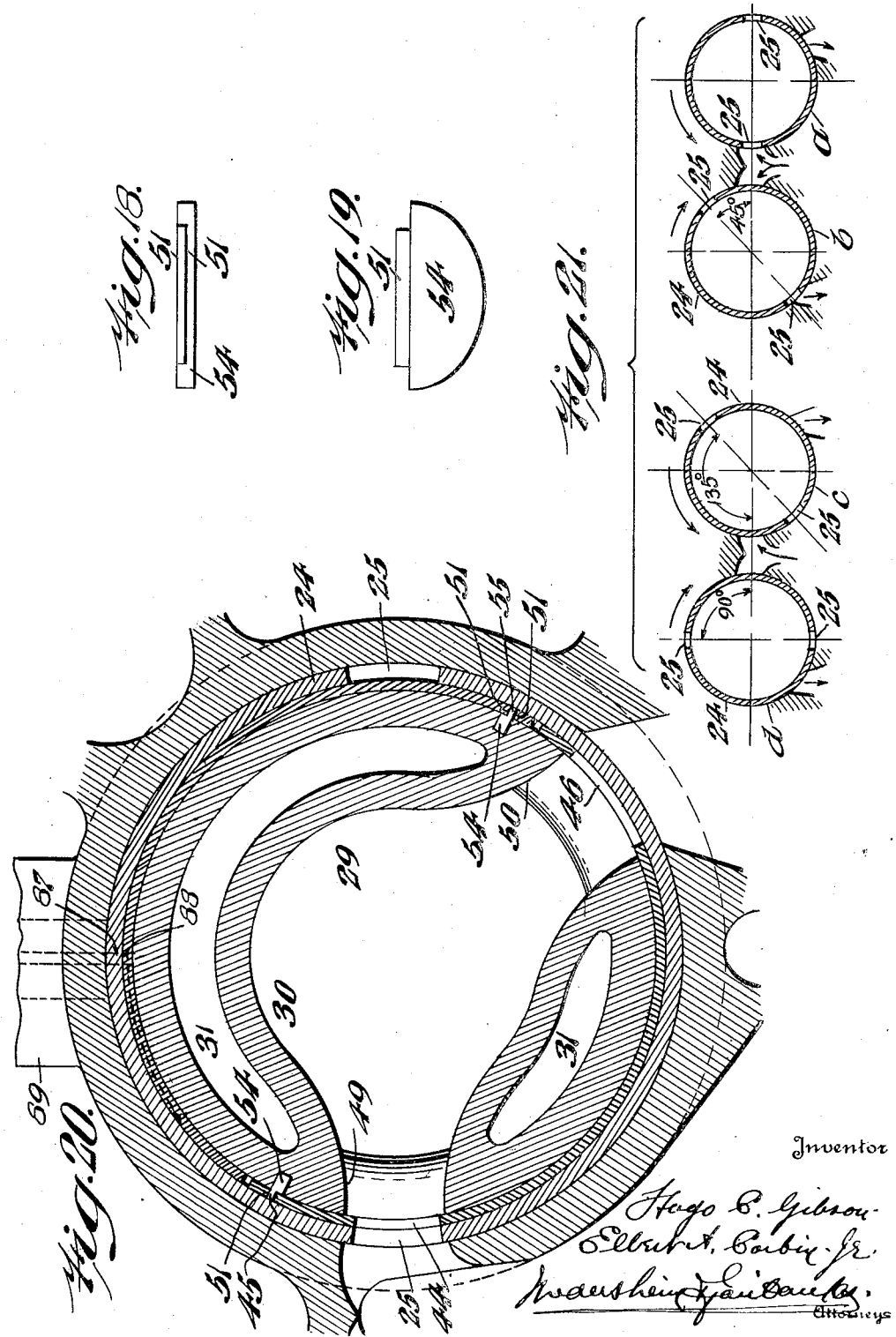

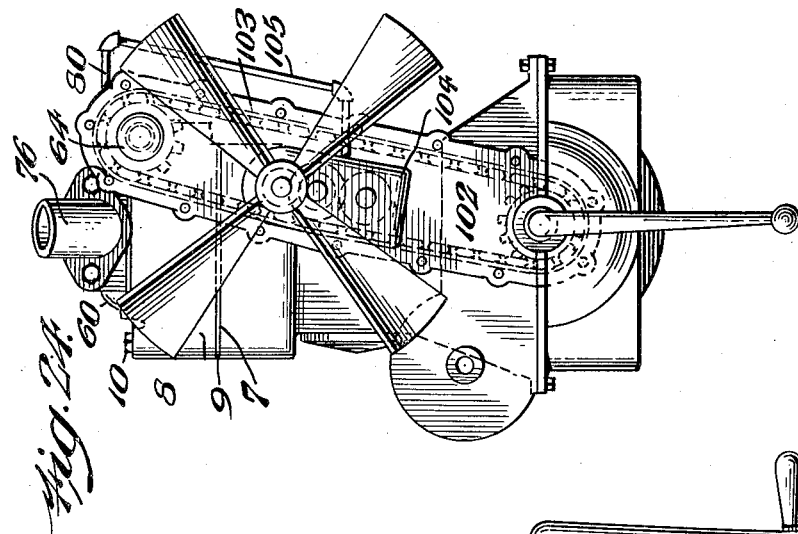

Patented May 7, 1929.

1,711,781

UNITED STATES PATENT OFFICE.

HUGO C. GIBSON, OF PHILADELPHIA, AND ELBERT A. CORBIN, JR., OF SWARTHMORE, PENNSYLVANIA.

ROTARY VALVE MECHANISM FOR INTERNAL-COMBUSTION ENGINES.

Application filed March 30, 1926. Serial No. 98,438.

Our invention relates to a novel construction of a demountable or interchangeable revoluble mechanism for an internal combustion engine wherein we locate the valves and their adjuncts in a valve jacket detachably secured to the top of the engine cylinder block, said valve jacket, being surmounted by a novel construction of a detachable water jacketed head, so that upon the removal of the latter, all the valvular elements are readily accessible, as well as the valve actuating mechanism.

It further consists of a novel construction of a demountable valve jacket having formed therein passages for the cooling medium, and means for the support of the valvular elements, their operating mechanism and lubricating devices.

It further consists of a novel construction of a valve provided with a geared upper ring, an inner upper counterbored wall, and a pendant valvular skirt or cylinder having oppositely located ports therein.

It further consists of a novel construction of a stationary center block, a sectional valve sleeve therefor, and upper and lower packing devices carried by said center block for packing the stationary valve sleeve sections and the rotary valves.

It further consists of a novel means carried by the head for locking said center blocks and their adjuncts in stationary position, when said head is placed in position on the valve jacket.

It further consists of a novel means for securing the valve sleeve sections in fixed position with reference to their center blocks.

It further consists of novel means for supporting the valves and center blocks in assembled position.

It further consists in a novel manner of collocating and actuating the valves, by means of a worm which is accessible upon the removal of the head.

It further consists of a novel manner of collocating the valve operating gearing at the upper portion of the demountable valve jacket intermediate the top of said jacket and its detachable head, whereby all the valve operating mechanism is readily accessible upon the removal of said head.

It further consists of a novel construction of a valve jacket and a head therefor having their juxtaposed portions constructed to accommodate the worm shaft and worms for actuating the revoluble valves employed, It further consists in the novel collocation of engine cylinders, a valve jacket for the valvular elements and a head for the latter, all being provided with interconnected passages and chambers for the circulation of the cooling medium, and for the intake and exhaust of the fuel and products of combustion.

By our invention we have provided an easily serviced valve, which never has to be cleaned and is noiseless and is a great advantage to a large fleet of trucks, which would be out of commission, periodically servicing for the above shortcomings.

Our invention further consists of a novel split sleeve, which provides the port openings used in timing the valves in one part of the double split sleeve while the outer non-ported part of the sleeve acts as a filler only. The sleeves of the prior art usually are split at one position only, which makes it necessary to discard a whole sleeve in case of any trouble arising at the ports themselves. It is a distinct advantage to leave the unported half sleeve in position on account of the desirability of retaining the conditioned or frictionally fitted surface of that half sleeve in relation to the inner surface of the rotating valve. If the ported portion becomes burned at the ports that port may be renewed with a new member and the non-ported portion can remain, which is impossible with the one piece split sleeve, since in case of injury to any portion of such sleeve, the entire sleeve must be replaced.

To the above ends, we have produced a novel valve mechanism, which may be applied to any poppet valve engine now on the market in which it is possible to get a power take-off from said engine, which engine has a removable head flush with the present poppet valves. Our novel valve mechanism can be designed to run at one half crank shaft speed with one port in the valve, one quarter crank shaft speed with two ports in the valve, and one eighth crank shaft speed with four ports in the valve. The object of having our novel head easily removable is that in servicing, the valves are immediately accessible and no skilled labor is needed in handling the job. The timing of these valves is a purely mechanical operation and can be handled by any ordinary garage man, and it will be apparent that the revoluble valves once they are set can never get out of time.

Our novel device can be sold to the layman, who can apply the same himself, needing no technical knowledge to make a successful assembly of the detachable jacket and head. The power take-off is of simple application and is so disposed that it cannot be put on in a manner that would derange the timing of the valves.

By our invention there is no carbon interference with the seating of the valves and no liability of carbon getting under the valve between it and its seat and pitting said valve and seat and thereby causing loss of compression. The life of a set of revoluble valves of our invention will be from two to four times the length of the average engine and many times the life of the average poppet valves.

For the purpose of illustrating our invention we have shown in the accompanying drawings, forms thereof which are at present preferred by us, since they will give in practice, satisfactory and reliable results, although it is to be understood that the various instrumentalities of which our invention consists can be variously arranged and organized and that our invention is not limited to the precise arrangement and organization of these instrumentalities as herein shown and described.

Referring to the drawings:—

Figure 1 represents a vertical sectional view of a revoluble valve mechanism and its adjuncts, embodying our invention, and assembled with respect to an internal combustion engine, certain of the parts being in elevation and the section being taken on line 1—1 of Figure 2.

Figure 2 represents a vertical sectional view of the upper portion of Figure 1, the section being taken on line 2—2 of Figure 1.

Figure 3 represents a vertical section on the line 3—3 of Figure 2.

Figure 4 represents a vertical section on line 4—4 of Figure 2.

Figure 5 represents a vertical section on line 5—5 of Figure 2.

Figure 6 represents a vertical section on line 6—6 of Figure 7.

Figure 7 represents a horizontal section on line 7—7 of Figure 2.

Figure 8 represents a vertical sectional view, similar to Figure 3, with the head, valve and its actuating mechanism removed.

Figure 9 represents on an enlarged scale, a vertical sectional view similar to Figure 3, but showing more clearly the lubricating mechanism, the section being on line 9—9 of Figure 7.

Figure 10 represents a plan view of the top of the valve jacket, valves and their adjuncts, the head being removed.

Figure 11 represents a plan view of the head which fits upon the top of Figure 10.

Figure 12 represents a vertical section on line 12—12 of Figure 11.

Figure 13 represents an end view of Figure 11.

Figure 14 represents a perspective view of our novel valve in detached position.

Figure 15 represents a perspective view of a sectional valve sleeve employed, in detailed position.

Figure 16 represents a perspective view of a center block employed, showing the valve sleeve and packing rings in position.

Figure 17 represents, on an enlarged scale, a side elevation of the valve, showing the manner of securing the sleeve sections in fixed position upon the center block.

Figures 18 and 19 represent a plan and side elevation respectively, of the adjusting key employed to secure the valve sleeve sections in proper timed position.

Figure 20 represents on an enlarged scale, a horizontal sectional view of a single jacket, its valve sleeve sections, center block and adjusting keys.

Figure 21 represents a diagrammatic view of the inlet and exhaust ports and the valve timing on cylinders $a, b, c, d$, which timing is shown as $a, b, d, c$.

Figure 22 represents a side elevation of a conventional motor, having our invention installed on the upper portion thereof, and connected to the engine shaft.

Figure 23 represents a horizontal section on line 23—23 of Figure 22.

Figure 24 represents an end view of Figure 22.

Our present invention is directed mainly to our novel construction of valves, packing, and lubricating devices therefor, novel readily accessible valve actuating mechanism, a novel removable valve jacket for the valves, and a novel head detachably secured to said valve jacket, in which head the spark plugs are positioned, said head, valve jacket and engine cylinders being provided with intercommunicating ports and passages for the free circulation of the cooling medium.

In the present instance, we have shown our invention as adapted to a four cylinder engine, the cylinders being cast integral or en bloc, but it will be apparent that the broad principle of our invention is equally adaptable to a one, six, eight or any multi-cylinder engine, and the cylinders may be arranged in line or oppositely disposed, and may obviously be vertically or angularly disposed.

Referring to the drawings, in which like reference characters indicate like parts, 1 designates an internal combustion engine, which, except as to our novel construction of valve gear and its adjuncts, may be of any conventional type, comprising the cylinder 2, the piston 3 therein and the crank case 4, in which the crank shaft 5 has its bearings, said piston being connected to said crank shaft by the connecting rod 6.

All the foregoing elements may be of any standard or conventional type, and the valve gear to be hereinafter referred to, may be actuated by any conventional valve mechanism actuated from the crank shaft or its adjuncts.

The valve jacket.

The top of the cylinder casting is machined at 7, and receives the valve jacket 8, which rests upon the gasket 9, said valve jacket being secured in position by the long and short bolts 10, whose lower ends screw into the top of the cylinder casting, as will be apparent from Figures 4 and 5.

The valve jacket 8 has the water passages 11 cored therein, which communicate with the cylinder water passages 12, at the points 13, and at the top of said jacket is the counterbore 14, forming the annular horizontal shoulder 15, from which extends downwardly the cylindrical wall 16, which terminates in the inwardly extending annular flange 17, below which is the counterbore 18, below which is the threaded wall 19, which acts as a pilot in assembling the center block and also as a means of holding the center block against explosion pressure as will be understood from Figures 2 and 8. As the foregoing construction is the same for the four or more valve chambers within the jacket 8, it will be apparent that a description of one will suffice for all.

The valve.

The valve 20, (see Figure 14) comprises the top ring 21, having the inner counterbore 22 and the peripheral teeth 23, below which depends the thin cylindrical portion or skirt 24, which constitutes the valve proper and is provided with the oppositely located ports 25, which may be one or more in number; when the valve is assembled in its chamber, the bottom wall 27 of the ring 21 rests upon the horizontal shoulder 15 and the outer periphery of the skirt 24 contacts with the bore 16, while its lower end 26 just clears the shoulder 17, it being apparent that the weight of the valve is taken up by the shoulder 15 and its outer periphery is confined within the cylindrical wall 16, while its inner periphery rotates upon the stationary sectional sleeve 41 and the packing rings carried by the stationary center block, which will now be described.

The center block and its adjuncts.

The center block 28 (see Figs. 1 to 3 and 16) has an axially disposed passage or chamber 29 of the general contour of a truncated cone, (see Figures 1, 2 and 3) whose wall 30 converges upwardly, said chamber constituting an explosion chamber for the juxtaposed cylinder below. As the walls 30 are subjected to intense heat, I provide a maximum cooling area by the provision of the cored passages 31 for the cooling medium. The center block is screwed into the valve jacket 8 to resist pressure.

The packing devices.

The outer cylindrical wall 32 of the center block terminates at its top in the upper packing chamber 33, having the lower horizontal wall 34 upon which rests the packing ring 35, above which are the two packing rings 36 of greater diameter (see Figure 9).

The cylindrical wall 32 terminates at its bottom in the lower packing chamber 37 against the upper horizontal wall 38 of which abuts the packing ring 39, while below the latter are the two packing rings 40 of greater diameter. The smaller rings 35 and 39 are of the same diameter, and pack the upper and lower inner peripheral portions of the stationary sectional sleeves 41 (next to be described), while the upper and lower rings 36 and 40 of greater diameter pack the upper and lower peripheral portions of the revoluble valve 20.

The sectional stationary sleeve 41 is composed of the two semi-cylindrical sections 42 and 43, (see Figure 15) the section 42 having the ports 44 and 46 and the hole 45 therein, while the section 43 has the hole 55 therein.

The center block assembly.

The spaces 48 between the juxtaposed edges of the sleeve portions 42 and 43 provide for the rotatable adjustment of said portions as is evident, and the port 44 registers with the port 49 while the port 46 registers with the port 50, when the parts are assembled, as will be understood from Figure 20. The sleeve portions 42 and 43 are held fixed and immovable with respect to the center block 28 by means of the shoulders 51, said shoulders projecting from or being integral with the keys 54, there being two of these keys for each center block and said keys being seated as seen in Figures 7, 16, 17 and 20, until the top of the shoulders 51 is flush or just within the inner periphery of the sleeve portions which are adjustably locked in position by the contact of the shoulders 51 with the shoulders 55 of said sleeve portions.

It will be seen from Figure 18, that the keys 54 may be reversed in their seats thus providing an adjustment of two positions of the sleeves 42 and 43. By this means we are enabled to adjust either sleeve in relation to the other. When the packing rings are snapped into position and the sleeve portions are assembled on the center block as heretofore explained, the latter will appear as seen in Figures 9 and 16 and can be readily manually positioned or dropped into place within the valve 20 as a unit, it being apparent that the overhanging upper annular flange or lip 56 fits nicely within the counterbore 22, while the lower terminal threaded portion 57 of the center block is screwed within the similarly threaded portion 19 of the jacket 8, as will be understood from Figures 2, 3, 8 and 9.

The several center blocks 28 with their packing rings and sleeves are held in fixed and immovable position by the dowel pins 58, which engage the dowel holes 59 in the top of said center blocks, said dowel pins depending from the bottom of the water jacketed head 60, which has the angularly disposed threaded seats 61 for the spark plugs 62.

*The valve actuating mechanism.*

The valve jacket 8 has a lateral extension 63 cast thereon to accommodate the worm shaft 64 which is provided with a pair of worms 65 and 66 having bushings or bearings 67. When four cylinders are employed having four valvular elements, which we have designated in Fig. 10 as 68, 69, 70 and 71, there will be seen that said elements are so correlated that the worm 65 is in mesh with and drives a gear of the valvular element 68, and that the gears of the valvular elements 68 and 69 are in mesh. In like manner the worm 66 is in mesh with and drives a gear of the valvular element 70 and the gears of the valvular elements 70 and 71 being in mesh, the latter element is driven by the rotation of the worm 66. It will be apparent that by our novel construction, the valvular elements will be rotated synchronously and in unison, so as to effect the control of the inlet and exhaust ports at the proper intervals. It will be evident that in the case of a six or eight cylinder engine, the additional valvular elements corresponding to the elements 68, 69, 70 and 71, already described, will be grouped in pairs as already explained, and a single worm will be employed to drive each additional pair of valvular elements.

*The water jacketed head and its adjuncts.*

The detachable water jacketed head 60, which has already been referred to, serves a number of useful functions, since it provides through the medium of the dowel pins 58, an effective locking means for retaining in fixed position the center blocks 28, and it also serves as a chamber and reservoir for the cooling medium to cool the upper portion of the explosion chambers 29, and the upper portion of the valvular elements, as 68, 69, 70 and 71. The head 60, comprises the top 72 and the bottom 73, between which is the cooling chamber 74. At the right hand end of the head 60 is the vertical flange 75, against which is secured the elbow 76, see Fig. 22, for the exit of the cooling medium to the radiator. The head 60 has cast therein the longitudinal chamber 77 for the reception and accommodation of the worm shaft 64 and the transverse inverted trough shaped chambers 78 accommodate the worms 65 and 66, said chambers 78 being superimposed above the lower chambers 79, one of which is seen in Figs. 3, 8, 9 and 10. In Fig. 22, I have shown the worm shaft 64 as driven by a metallic link chain 103 of the conventional type from the engine shaft, a section of which chain and its casing is shown in Fig. 23, but it will be apparent that said shaft 64 may be driven by any other or equivalent construction, and may be attached to any other source of power convenient to the design.

In Fig. 23, 101 designates the chain case, 102 the chain case cover, and 103 the chain. 104 designates a rotary oil pump housed within the chain case cover, whereby the lubricant is delivered under pressure through the pipe 105 to the pipe 80, whereby the individual valves are supplied.

*The lubricating system.*

As the valves 24 rotate at a relatively high speed, it is necessary to provide for their effective lubrication, which we accomplish by means of the lubricant pipe 80, which may have the lubricant forced thereinto by any suitable means and is provided with three T fittings 81 for three of the valvular elements and with an elbow 82 for the terminal valvular element. The fittings each have an inlet passage 83, which discharge the lubricant into the passage or tube 84, whose inner end discharges the lubricant into the port 85 of the plunger 86, which port leads to the port 87 in the valve 24, which discharges into the groove 88 of the juxtaposed stationary sleeve. In practice, we employ two ports 87 and they discharge the lubricant into the channels 88 seen in Figs. 9 and 20.

The assembly or collocation of the passages 83 and 84 may be effected by various means, but we preferably employ the construction seen in Figs. 3, 4, 5, 8 and 9, wherein 89 designates lateral bosses cast on the valve jacket 8, one for each valvular element, and each having the chamber 90 therein. The inner portion of said chamber 90 is occupied by the plunger 86, already referred to, which contains the bushing 91, in which the inner end of the tube 84 is accurately fitted. 92 designates packing through which the tube 84 passes and said packing is pressed against the ends of the plunger 86, and the bushing 91, by the tension of the spring 93 upon the follower 94. The outer end of the spring 93 is compressed by the inner wall of the closure 95, which has a tubular exteriorly threaded extension 97 which is screwed into the threaded seat 96 of the boss 89. The closure 95 is in the form of a disc and has the central body portion or outer extension 98, in which the tube 84 has a drive fit, or is brazed thereto, the outer portion of said extension having the nut 99 screwed thereon, within which the flanged end 100 of the fitting 81 is contained.

It will thus be seen that upon the proper manipulation of the nuts 99, the lubricating devices are readily accessible for the purposes of inspection, replacement or repair. It will be apparent that the lubricant can be forced into the pipe 80 by any suitable means, but in Figs. 22 and 24, we have shown the mechanism which we preferably employ.

The operation is as follows, it being understood that our invention is designed in one of its fields to replace the conventional poppet valve and its operating mechanism found in any loose head engines. Accordingly after the removal of the cylinder head, we first of all plug up all the valve stem guides 106 if any with plugs 107, as will be understood from Figure 6, which prevents the by-passing of fuel and exhaust gases. We next attach to the cylinder block our device, which has already been assembled together comprising the valve jacket 8 and the head 60 with the enclosed valve members and their adjuncts. We next place in position the driving mechanism seen in Figures 22, 23 and 24, which connects our construction with the source of power in the engine itself, which in this case is the main crank shaft. Before any of this assembling is done, the proper timing position has been obtained in both our valve mechanism and our chain case, so that when they are assembled together they are co-ordinated in proper time with No. 1 piston of the engine at the end of the compression stroke, it being easy to rotate the crank shaft of the engine slowly to obtain this position. This proper position of the No. 1 piston is easily seen before the head is assembled in place. It will be understood that these different adjuncts are bolted securely to the cylinder block and to each other as will be understood from Figures 2, 4, 5, 6, 22 and 24. In Figure 21 will be seen a diagram which shows the valve $a$ serving No. 1 piston in the position of full inlet opening. The valve $b$ for No. 2 piston is 45 degrees away from full inlet opening. Valve $d$ for No. 4 piston is 90 degrees away from full inlet opening and valve $c$ for No. 3 piston is 135 degrees away from full inlet opening. It will now be seen also that valve $b$ is just starting to close the exhaust opening and all other ports are sealed except the inlet of valve $a$.

While we have disclosed our invention as being applicable to any of the conventional poppet valve engines, it will be apparent that we are not confined solely to this use, as our device is applicable to any entirely new and complete engine, in which all the component parts are especially designed to coact with our novel valve mechanism and its adjuncts. The revoluble or rotating valve eliminates vibrations present in a reciprocating poppet valve and which are destructive to the life of the average engine, and even cause discomfort to the passangers within the vehicle body. The poppet valve when foul from products of combustion can become inoperative through these products, as carbon becomes very hard when thoroughly baked by the flame of combustion and gets between the valve and its seat, thereby holding the valve open, when it should be closed, pitting the valve seat permanently and causing loss of compression and consequent reduction of power. Our novel revoluble valve is not subject to these faults and for this reason needs practically no servicing or attention.

The springs actuating poppet valves are very stiff to cause proper valve action and absorb many times the horse power necessary to rotate revoluble valves. This loss in power is constant in a poppet valve engine and for that reason, it will be found that a revoluble valve engine is much more economical. There are reciprocating sleeve valve engines on the market, which have the advantage of good compression, but they still have the disadvantage of setting up vibrations within the engine and this is entirely overcome by our novel revoluble valve. The type of engine we show in our drawings has separate valves for each cylinder, and they are very easily repaired as they are easily exposed upon the removal of the water jacketed head and can be individually removed for repair or replacement by any unskilled mechanic, while the reciprocating type of sleeve valve is a master mechanic's job as it has unsatisfactory features which are not always solved by some of the best engineers. The smoking caused by the lubrication of the valve in reciprocating sleeve valve engines particularly when idling is not present in the revoluble valve.

Having thus described our invention what we claim as new and desire to secure by Letters Patent is:—

1. The combination of a loose head engine with a demountable valve jacket, a head therefor, rotary valves mounted in said jacket, means for actuating said valves, center blocks in each of said valves sectional ported adjustable sleeves secured to each center block, and means carried by said center block for locking the sleeve sections in adjusted position.

2. The combination of a loose head engine with a demountable valve jacket, a head for said valve jacket, rotary valves mounted in said jacket, a pair of said valves being geared together, center blocks for each of said valves, sectional ported adjustable sleeves secured to each center block, and means carried by said center block for locking the sleeve sections in adjusted position.

3. The combination of a loose head engine with a demountable valve jacket, a head therefor, rotary valves mounted in said jacket, said valves being arranged in pairs geared together, a pendant cylindrical skirt for each valve having ports therein, ported center blocks, adjustable ported sleeves carried by said center blocks, the latter being positioned within said valves, and means carried by said center block for locking the sleeve sections in adjusted position.

4. In a device of the character stated, a revoluble valve comprising an upper exteriorly toothed ring, a pendant cylindrical skirt having oppositely located ports therein and an upper inner counterbore, in combination with a center block for said valve, sectional ported adjustable sleeves, secured to said center block, and means carried by said center block for locking said sleeve sections in adjusted position.

5. In a device of the character stated, a demountable center block comprising an internal explosion chamber and an outer cylindrical wall, there being a water jacket between said outer wall and explosion chamber, and held by a threaded portion engaging the valve jacket.

6. In a device of the character stated, a demountable center block comprising an internal explosion chamber, and an outer cylindrical wall, there being a water jacket between said outer wall and explosion chamber, an upper overhanging annular flange for said center block and a valve sleeve made in sections carried by said center block, and having ports therein, and being adjustable on said center block.

7. In a device of the character stated, a center block having an inner annular upwardly converging wall with ports therein, and an outer cylindrical wall inclosing a water jacket, a sleeve surrounding and carried by said vertical wall and composed of a plurality of sections, having ports therein aligning with ports in said center block, and means common to said center block and sleeve sections for effecting the independent adjustment of each of said sleeve sections.

8. In a device of the character stated, a center block having ports therein, adjustable sleeve sections having ports therein mounted on said center block, and means carried by said center block for locking said sleeve sections in adjusted position.

9. In a device of the character stated, a center block, in combination with a sectional sleeve having ports therein aligning with ports in said center block, openings in said sleeve sections, and keys carried by said center block and having outer lugs adapted to engage the walls of said sleeve openings for independently adjusting the sections of the latter.

10. In a device of the character stated, a water jacketed head, a plurality of revoluble valves provided with toothed rings and arranged in pairs with said rings in mesh, a jacket for said valves, a center block for each of said valves, adjustable sleeve sections for each of said center blocks, means for supporting a center block and its sleeve sections within said valve jacket, and means carried by said center blocks for locking said sleeve sections in adjusted position.

11. The combination of a loose head engine with a demountable valve jacket, a head for said valve jacket, rotary valves mounted in said jacket, a pair of said valves being geared together, stationary center blocks for each of said valves and supported by the jacket, sectional ported adjustable sleeves for each center block, locking devices common to said head and center blocks, and means carried by said center blocks for locking the sleeve sections in adjusted position.

12. The combination of a loose head engine with a demountable valve jacket, a head therefor, rotary valves mounted in said jacket, said valves being arranged in pairs geared together, a pendant cylindrical skirt for each valve having ports therein, stationary ported center blocks, adjustable ported sleeves carried by said center blocks, the latter being positioned within said valves, and locking devices common to said head and said center blocks.

13. The combination of a loose head engine, with a demountable valve jacket, a head therefor, rotary valves mounted in said jacket, said valves being arranged in pairs geared together, a pendant cylindrical skirt for each valve having ports therein, stationary ported center blocks, adjustable ported sleeves carried by said center blocks, a counter bore in the upper inner portion of each of said valves, overhanging flanges on the tops of said center blocks, locking devices common to said head and said center block, and means carried by said center blocks for locking said sleeves in adjusted position.

14. In a device of the character stated, a revoluble valve comprising an upper exteriorly toothed ring, a pendant cylindrical skirt having oppositely located ports therein, and an upper inner counterbore, a stationary center block having an explosion chamber therein, sleeve sections carried by said center block, and means carried by said center block for locking said sleeve sections in adjusted position.

15. In a device of the character stated, a center block, having an inner annular upwardly converging wall with ports therein, and an outer cylindrical wall inclosing a water jacket, a sleeve surrounding and carried by said vertical wall and composed of a plurality of sections, having ports aligning with ports in said center block, means common to said center block and sleeve sections for effecting the independent adjustment of each of said sleeve sections, means carried by said center block for locking said sleeve sections in adjusted position and a revoluble valve within which said center block is fixedly supported.

16. In a device of the character stated, a center block having ports therein, adjustable sleeve sections having ports therein mounted on said center block, means carried by said center block for locking said sleeve sections in adjusted position, a hollow valve within which said center block is supported and means for locking said center block in fixed position.

17. In a device of the character stated, a center block, in combination with a sectional sleeve having ports therein aligning with ports in said center block, said sleeve sections having openings therein, and keys carried by said center blocks and having outer lugs adapted to engage the walls of said sleeve openings for independently adjusting the sections of the latter, one wall of said lugs coinciding with the wall of said sleeve opening.

18. In a device of the character stated, a water jacketed head, a plurality of revoluble valves provided with toothed rings and arranged in pairs with said rings in mesh, a center block for each of said valves, adjustable sleeve sections for each of said center blocks, keys for each of said sleeve sections for locking the latter in adjusted positions, and means for supporting the center blocks and their sleeve sections within said valves.

HUGO C. GIBSON.
ELBERT A. CORBIN, Jr.